(12) United States Patent
Chen et al.

(10) Patent No.: US 8,374,659 B2
(45) Date of Patent: Feb. 12, 2013

(54) SLIDING MECHANISM WITH CHANGEABLE PATHS AND CELLULAR PHONE HAVING THE SAME

(75) Inventors: Hsin-Chih Chen, Taipei (TW); Alan C. Lin, Taipei (TW)

(73) Assignee: National Taiwan University of Science and Technology, Taipei (TW)

( * ) Notice: Subject to any disclaimer, the term of this patent is extended or adjusted under 35 U.S.C. 154(b) by 144 days.

(21) Appl. No.: 13/098,875

(22) Filed: May 2, 2011

(65) Prior Publication Data

US 2012/0149446 A1     Jun. 14, 2012

(30) Foreign Application Priority Data

Dec. 9, 2010   (TW) ............................... 99143091 A

(51) Int. Cl.
    *H04M 1/00* (2006.01)
(52) U.S. Cl. ........... 455/575.4; 379/433.11; 379/433.12; 379/433.13
(58) Field of Classification Search ............... 455/575.4; 379/433.11–433.13
    See application file for complete search history.

(56) References Cited

U.S. PATENT DOCUMENTS

| 2012/0149446 A1* | 6/2012 | Chen et al. ................. 455/575.4 |
| 2012/0231859 A1* | 9/2012 | Makino et al. ............. 455/575.4 |

FOREIGN PATENT DOCUMENTS

| TW | I299075 | 7/2008 |
| TW | M348430 | 1/2009 |
| TW | M348449 | 1/2009 |
| TW | M354994 | 4/2009 |

* cited by examiner

*Primary Examiner* — Lester Kincaid
*Assistant Examiner* — Mehmood B Khan
(74) *Attorney, Agent, or Firm* — Muncy, Geissler, Olds & Lowe, PLLC

(57) ABSTRACT

A sliding mechanism with changeable paths and a cellular phone are disclosed. The sliding mechanism comprises a sliding plate, a V-shaped resilience device, and a fixed plate. The sliding plate is fixed to a sliding portion of the cellular phone, and the fixed plate is fixed on a holding base of the cellular phone. When the sliding plate is pushed to move a predetermined distance, the sliding plate can be driven by the resilient force of the V-shaped resilience device to automatically slide with respect to a V-shaped support having a turning ring and along guiding slots and guiding edges on the fixed plate. The sliding plate can automatically slide through a remaining portion of a path when the sliding plate is first pushed to move a predetermined distance, thereby enabling answering or hanging up of the cellular phone semi-automatically.

8 Claims, 6 Drawing Sheets

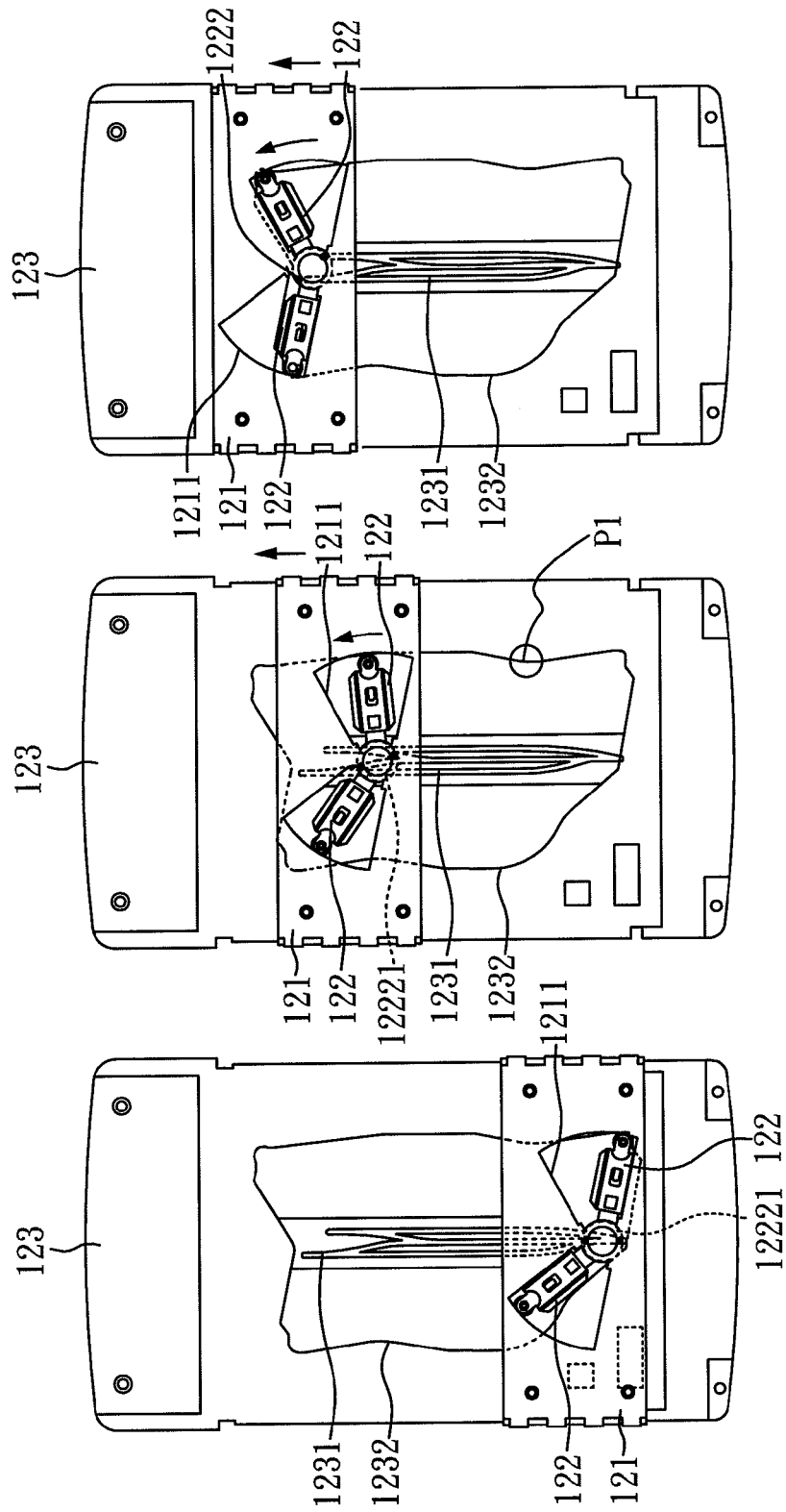

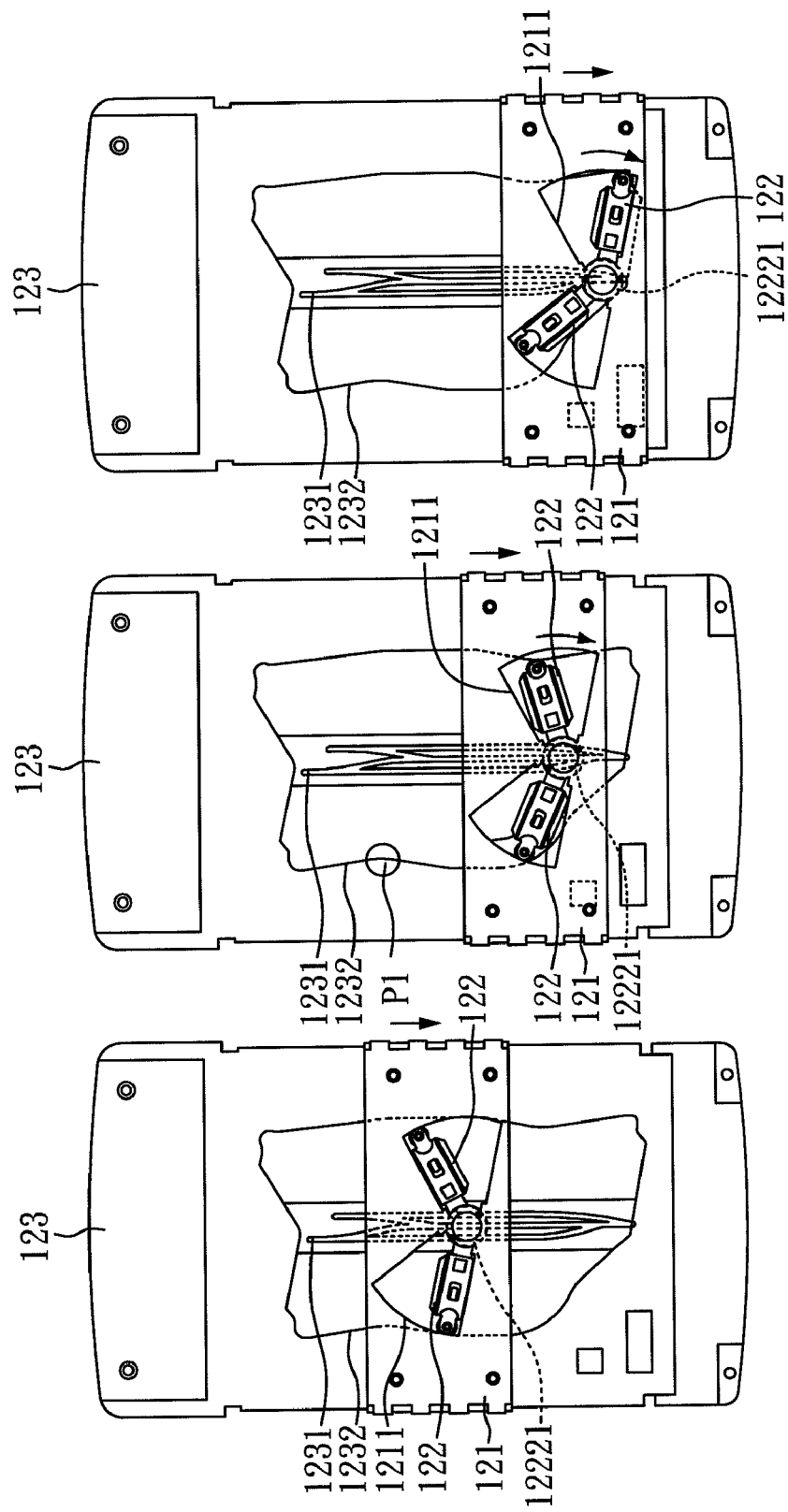

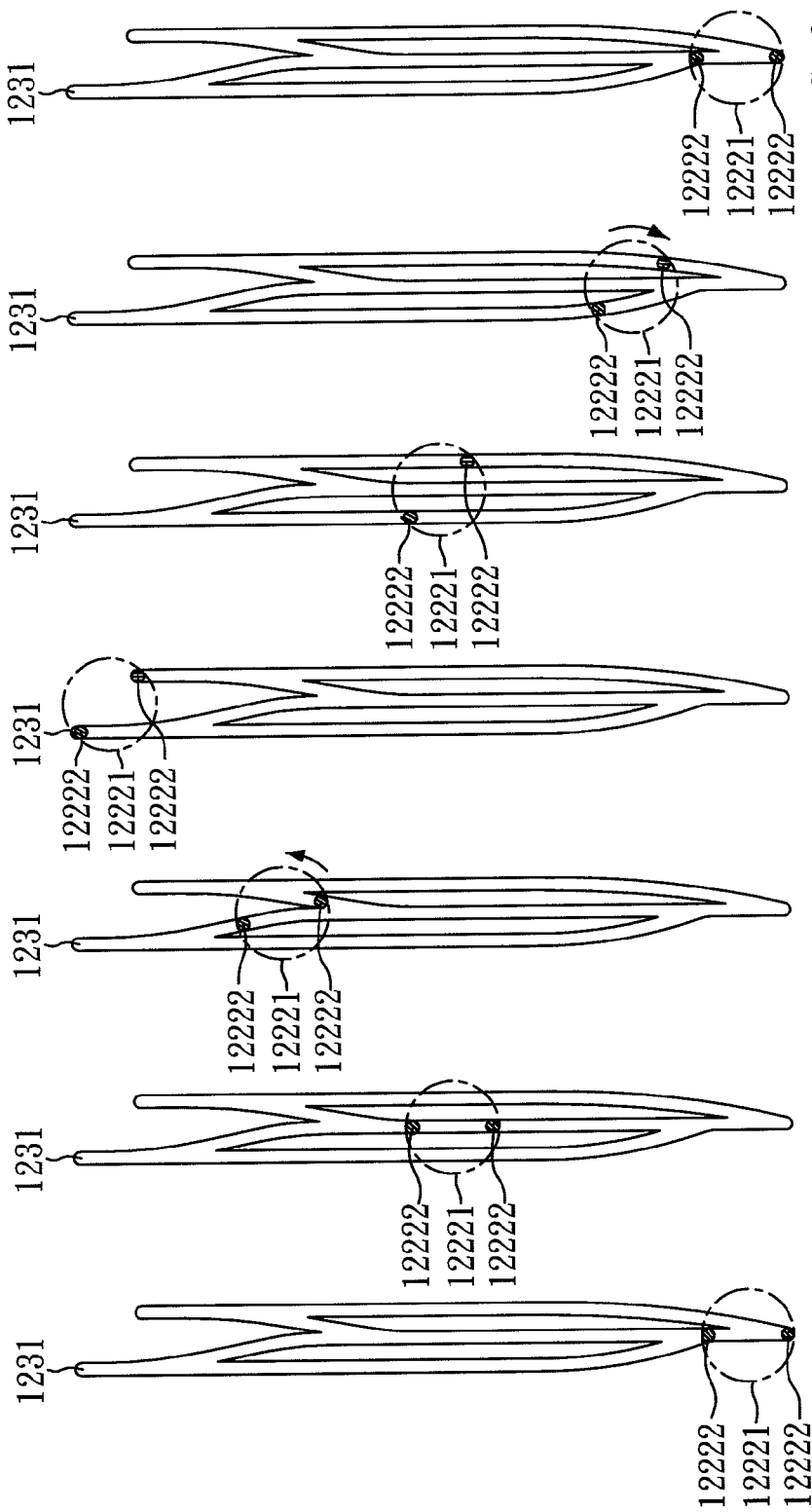

SLIDING MECHANISM WITH CHANGEABLE PATHS AND CELLULAR PHONE HAVING THE SAME

BACKGROUND OF THE INVENTION

1. Field of the Invention

The present invention relates to a sliding mechanism and a cellular phone having the same.

2. Description of the Related Art

The penetration rate of cellular phones is higher than ever, and such phones are ubiquitous in modern society. Therefore, cellular phone manufacturers produce a variety of cellular phones to provide more choices. For example, there are many ways to answer/hang up a call, such as clicking a button, folding up the phone, or sliding the cover.

A traditional sliding mechanism for cellular phones is disclosed in Taiwan patents No. M348449 and No. M354994, in which a cover of the phone is opened or closed automatically by pressing a wire-wound spring or SA spring to generate a resilient force. However, the wire-wound spring could have problems such as spring fatigue, and the SA spring tends to increase the manufacturing cost.

Additionally, other labor-saving techniques are disclosed in Taiwan patent No. I299075 and M348430. In these patents, a user has to push a cover or a sliding plate of the phone for more than half of the total distance for the cover/sliding sliding plate to finish the remaining portion of the path automatically, making it inconvenient for users.

SUMMARY OF THE INVENTION

It is an object of the present invention to provide a sliding mechanism with changeable paths, which uses the combination of a turning ring, guiding slots, and a guiding edge to guide a V-shaped resilience device to slide through different paths when a user opens or closes a cover of a cellular phone. The guiding edge is implemented such that a spring is compressed to generate a resilient force when the V-shaped resilience device is sliding along the guiding edge. Thereafter, the resilient force will be released to assist the V-shaped resilience device to slide through the remaining path automatically, while the user needs only to push a sliding plate of the cellular phone for a predetermined distance (for example, 30% of the total path, which is less than 50% of the path). In other words, the user can slightly push the cover to cause the cover to open/close automatically. Furthermore, the V-shaped resilience device solves the problems of high cost and spring fatigue that the wire-wound spring could encounter; and it can provide nearly automatic cover open/close operations for the cellular phone.

In order to achieve the above objects, the present invention provides a sliding mechanism with changeable paths for a cellular phone, wherein the cellular phone is provided for a user to answer or hang up a call by sliding the sliding mechanism of the cellular phone. The sliding mechanism comprises a sliding plate, a V-shaped resilience device, and a fixed plate. The sliding plate is fixed to the sliding portion of the cellular phone; the sliding plate comprises a plurality of fan-shaped spaces, wherein each one of the plurality of fan-shaped spaces is facing each other with respect to an axis. The V-shaped resilience device is fixed on the sliding plate. The V-shaped resilience device has each end disposed in each one of the plurality of fan-shaped spaces, respectively.

The V-shaped resilience device comprises a plurality of spring elements, a V-shaped support, and a plurality of connectors. The V-shaped support comprises a turning ring having at least one guiding protrusion extending downward. The plurality of connectors each connect with one end of the V-shaped support respectively, and each one of the plurality of connectors has at least one supporting portion; each supporting portion corresponds to one spring element, and each spring element is disposed between one connector and the V-shaped support. The fixed plate is fixed to the holding base. The fixed plate comprises a plurality of guiding slots and a guiding edge, wherein the plurality of guiding slots and the guiding edge can be used to change a sliding path of the sliding plate. One of the connectors is in contact with the guiding edge to press at least one of the plurality of spring elements to generate a resilient force, which causes the at least one guiding protrusion in the plurality of guiding slots to slide along at least one of the plurality of guiding slots.

Additionally, the present invention provides a cellular phone comprising a holding base, a sliding portion that is driven by a sliding mechanism to slide back and forth with respect to the holding base, and the sliding mechanism.

BRIEF DESCRIPTION OF THE DRAWINGS

FIG. 4a-c illustrate diagrams showing the operation of the V-shaped resilience device and the guiding edge when the cover of the cellular phone is open;

FIG. 5a-c illustrate diagrams showing the operation of the V-shaped resilience device and the guiding edge when the cover of the cellular phone is closed; and FIG. 6a-g illustrate diagrams showing the operation of the turning ring and the guiding slot of the present invention.

DETAILED DESCRIPTION OF THE PREFERRED EMBODIMENT

The advantages and innovative features of the invention will become more apparent from the following detailed description when taken in conjunction with the accompanying drawings.

Figure 1:
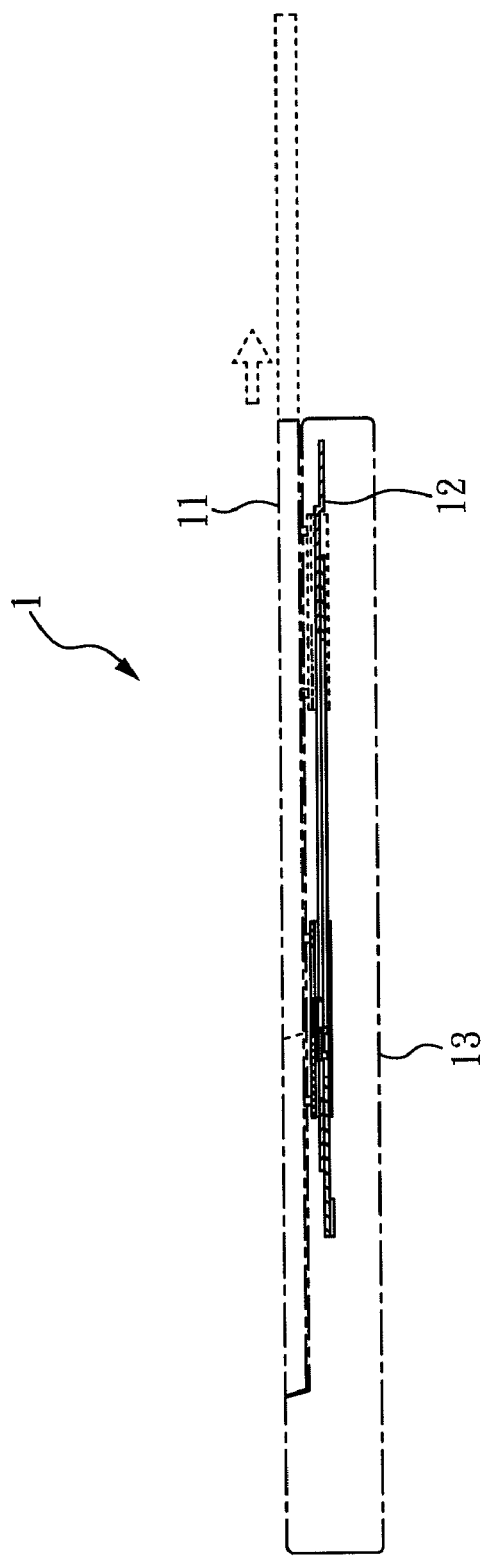
FIG. 1 illustrates a side view of a cellular phone of the present invention.

Please refer to FIG. 1; the present invention provides a sliding mechanism 12 with changeable paths for a cellular phone 1, wherein the cellular phone is designed such that a user can answer a call by pushing a sliding portion 11 (along the direction of the arrow) of the cellular phone 1 forward to cause the sliding portion 11 of the sliding mechanism 12 to slide with respect to a holding base 13, or disconnect a call by pushing the sliding portion 11 backward to slide the sliding portion 11.

Figure 2:
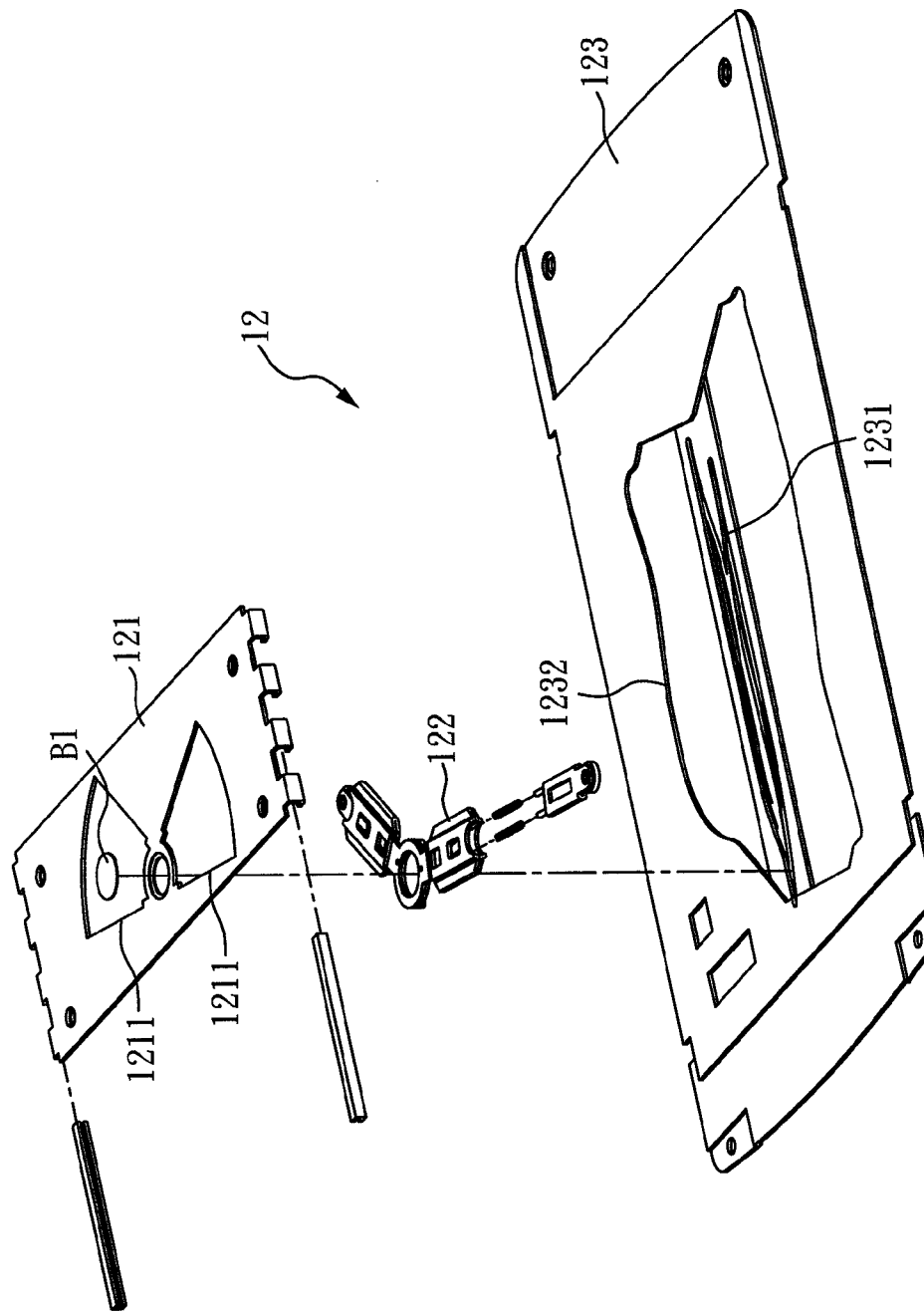
FIG. 2 illustrates a 3D perspective view of a sliding mechanism of the present invention.

Please refer to FIG. 2; the sliding mechanism 12 with changeable paths comprises a sliding plate 121, a V-shaped resilience device 122, and a fixed plate 123. The sliding plate 121 has a plurality of fan-shaped spaces 1211 disposed with respect to an axis, and each of the fan-shaped spaces faces the other, thereby providing the space for the V-shaped resilience device 122 during operation. A shaft pin B1 is used at the axis to connect the V-shaped resilience device 122 and the sliding plate 121 such that the V-shaped resilience device 122 can slide along with the sliding plate 121. The sliding plate 121 is disposed with tooth-like Π-shaped grooves on both of its sides, with each Π-shaped groove comprising a guiding strip made of POM at its cover to prevent the sliding portion 11 of the sliding mechanism 12 from metal scratching when sliding along the holding base 13.

Figure 3:
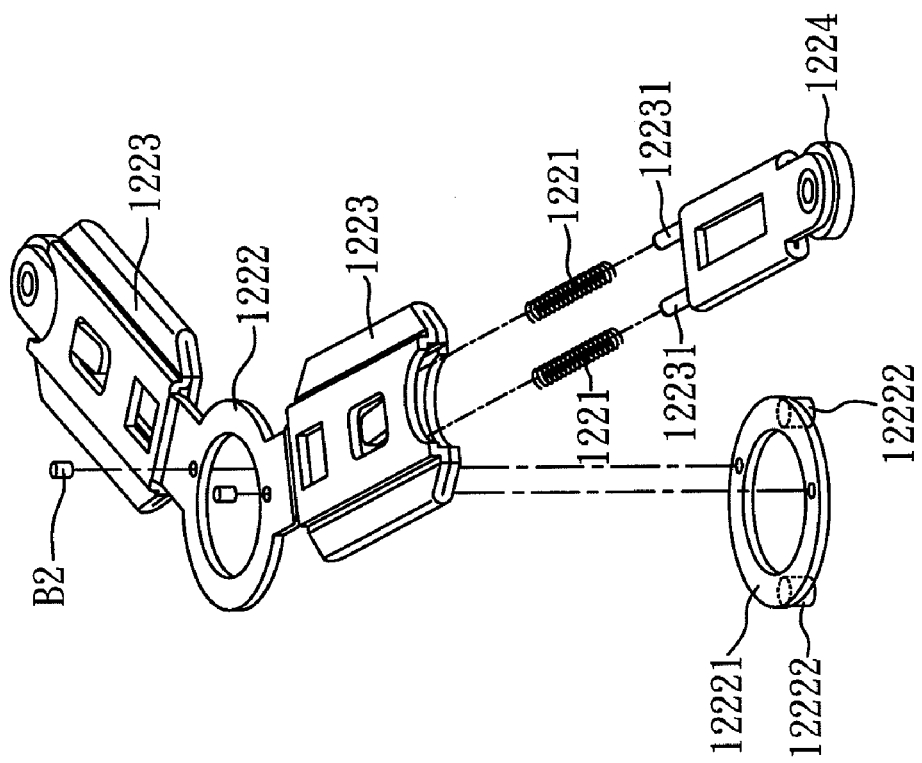
FIG. 3 illustrates a 3D perspective view of a V-shaped resilience device of the present invention.

Please refer to FIG. 3; the V-shaped resilience device 122 comprises a plurality of spring elements 1221, a V-shaped support 1222, and a plurality of connectors 1223. Although in this embodiment, the spring elements 1221 are illustrated with wire-wound springs, the spring elements 1221 are not limited to wire-wound springs. The V-shaped support 1222 comprises a turning ring 12221 and at least one guiding protrusion 12222 extending downward. The turning ring 12221 is fixed to the V-shaped support 1222 by at least one fixing device such as a pin B2. Although in this embodiment the turning ring 12221 and the V-shaped support 1222 are separate components, those who are familiar with the art should know that the turning ring 12221 can be a part of the V-shaped support 1222 and does not need the pin B1 to fix it to the V-shaped support 1222.

Each one of the plurality of connectors 1223 is connected to one side of the V-shaped support 1222 respectively, with each connector 1223 being disposed with at least one supporting portion 12231. Each supporting portion 12231 corresponds with each spring element 1221 to dispose each spring element 1221 between each connector 1223 and the at least one supporting portion 12231, thereby fixing the spring elements 1221 and making a space (such as a compressing space for the wire-wound spring) for the spring elements 1221 to be compressed to accumulate resilient force and to expand after compression.

Please refer to FIG. 2 and FIG. 4a-c; the fixed plate 123 comprises a plurality of guiding slots 1231 and a guiding edge 1232, wherein the plurality of guiding slots 1231 and the guiding edge 1232 can be used to change a sliding path of the sliding plate 121. The plurality of guiding slots 1231 is designed with two loops of guiding slots for the sliding plate 121 and the V-shaped resilience device 122 to slide back and forth on the fixed plate 123. Furthermore, the guiding edge 1232 is an irregular loop that helps to compress or release the connectors 1223 of the V-shaped resilience device 122 when the sliding plate 121 is sliding. A roller, as shown in FIG. 3, can be disposed for touching the guiding edge 1232 when sliding. When one of the connectors 1223 of the V-shaped resilience device 122 is first compressed and then released, the spring elements 1221 can generate a resilient force, while the fan-shaped spaces 1211 can provide spaces for the connectors 1223 of the V-shaped resilience device 122 to move, as shown in FIG. 4a-4c. Therefore, the resilient force generated by the spring elements 1221 can cause the sliding plate 121 and the V-shaped resilience device 122 to slide automatically. Further operations of the guiding edge 1232 and the guiding slots 1231 are detailed below.

As shown in FIG. 4a, when the cover of the cellular phone 1 is closed, only the roller 1224 of the connector 1223 at the right side will be in contact with the right guiding edge 1232, wherein the relative positions of the plurality of guiding protrusions 12222 in the plurality of guiding slots 1231 are shown in FIG. 6a. Please refer back to FIG. 4a; when the cover of a cellular phone is opening, that is, the sliding plate 121 is sliding upward, the plurality of the guiding protrusions 12222 are in the same guiding slot 1231, also shown in FIG. 6b. Please refer to FIG. 4b; when a user pushes the sliding portion 11 of the sliding plate 12 to cause the sliding plate 121 to slide to the P1 point of the guiding edge 1232, the V-shaped resilience device 122 will compress its connectors 1223; after the sliding plate 121 slides past the point P1, the connectors 1223 will be released, and the sliding plate 121 and V-shaped resilience device 122 will continue to slide upward on the fixed plate 123 with the resilient force provided by the spring element 1221.

When the sliding plate 121 continues to slide upward, the plurality of guiding protrusions 12222 also slide in the plurality of guiding slots 1231 to come to the position shown in FIG. 6c; namely, the intersecting point of the two loops of guiding slots 1231; each one of the plurality of guiding protrusions 12222 will slide along a different loop of the guiding slot 1231 to the position shown in FIG. 6d respectively. At this time, as shown in FIG. 4b, the V-shaped resilience device 122 will rotate in the counterclockwise direction until the cover of the cellular phone 1 is open, as shown in FIG. 4c, so that the user can make or answer a call.

When the user wants to close the cover, before the sliding plate 121 slides, only the roller 1224 of the connector 1223 on the left side will be in contact with the left guiding edge 1232. As shown in FIG. 5a-b, when the user pushes the sliding portion 11 of the sliding plate 121 downward, the sliding plate 121 slides downward to the P2 point of the guiding edge 1232, and the V-shaped resilience device 122 will compress its connectors 1223; after the sliding plate 121 slides past the point P2, the connectors 1223 will be released, and the sliding plate 121 and V-shaped resilience device 122 will continue to slide downward on the fixed plate 123 with the resilient force provided by the spring element 1221.

Please also refer to FIG. 6e; resilience the relative positions of the plurality of the guiding protrusions 12222 in the plurality of guiding slots 1231 when the sliding plate 121 and the V-shaped resilience device 122 slide downward are shown in FIG. 6e. When the sliding plate 121 and the V-shaped resilience device 122 continue to slide to the positions shown in FIG. 6f, the turning ring 12221 comprising the guiding protrusion 12222 will rotate in the clockwise direction (as shown in FIG. 5b) until the cover of the cellular phone 1 is closed, as shown in FIG. 5c (and also shown in FIG. 6g), such that the user can disconnect the call.

In this embodiment, the guiding edge 1232 is outside the two loops of the guiding slots 1231. Therefore, when the cover is opened or closed, at least one of the plurality of connectors 1223 will be in contact with the guiding edge 1232 and slide along the irregular loop of the guiding edge 1232 back and forth in one loop to compress and then release the spring element 1221; that is, when the spring element 1221 reaches the position about 30% of the total path (P1 point), the connector 1223 releases the spring element 1221 and allows the spring element 1221 to release its accumulated resilient force, thereby driving the sliding plate 121 to continue sliding forward (or upward as shown in the figure) or backward (or downward as shown in the figure) to finish the remaining portion of the path. Since the cover open/close operations are performed on different sides of the guiding edge 1232, the point where the spring element 1221 accumulates the most resilient force can be designed to be the position of about 30% of the total path (P1 or P2 point). Therefore, the user can push the sliding portion 11 of the sliding plate 121 for a distance of less than one half of the path to cause the sliding portion 11 automatically to finish the remaining portion of the path, thereby making it easier for the user to use the cellular phone.

The present invention discloses a sliding mechanism for a cellular phone; as shown in FIG. 1, the present invention also provides a cellular phone 1 comprising a holding base 13, a sliding portion 11, and the sliding mechanism 12 as described above. The sliding portion 11 is driven by the sliding mechanism 12 to slide back and forth with respect to the holding base 13; the sliding portion 11 can automatically finish the remaining portion of the path after the user has pushed it for a distance of less than one half of the path, thereby facilitating the cover open/close operations and making it easier for the user to use the cellular phone.

It is noted that the above-mentioned embodiments are only for illustration. It is intended that the present invention cover modifications and variations of this invention provided they fall within the scope of the following claims and their equivalents. Therefore, it will be apparent to those skilled in the art that various modifications and variations can be made to the structure of the present invention without departing from the scope or spirit of the invention.

What is claimed is:

1. A sliding mechanism with changeable paths for a cellular phone, the sliding mechanism comprising:
    a holding base and a sliding portion configured to be driven by the sliding mechanism to slide back and forth with respect to the holding base,
    a sliding plate fixed to the sliding portion, the sliding plate comprising a plurality of fan-shaped spaces, wherein each one of the plurality of fan-shaped spaces faces the other with respect to an axis;
    a V-shaped resilience device fixed on the sliding plate, the V-shaped resilience device having each end disposed in each one of the plurality fan-shaped spaces respectively, wherein
    the V-shaped resilience device comprises: a plurality of spring elements;
    a V-shaped support comprising a turning ring having at least one guiding protrusion extending downward; and
    a plurality of connectors, each connecting with one end of the V-shaped support respectively, each one of the plurality of connectors having at least one supporting portion, each supporting portion corresponding to one spring element, and each spring element being disposed between a roller of one connector and the V-shaped support; and
    a fixed plate fixed to the holding base, the fixed plate comprising a plurality of guiding slots and a guiding edge, wherein the plurality of guiding slots and the guiding edge can be used to change a sliding path of the sliding plate; wherein one of the connectors is in contact with the guiding edge to press at least one of the plurality of spring elements to generate a resilient force, which causes the at least one guiding protrusion in the plurality of guiding slots to slide along at least one of the plurality of guiding slots.

2. The sliding mechanism as claimed in claim 1, wherein more than one guiding protrusions are substantially used to form two loops; the two loops share one of the guiding slots to allow the sliding plate to slide back and forth on the fixed plate along the two loops respectively.

3. The sliding mechanism as claimed in claim 2, wherein the guiding edge substantially comprises an irregular loop.

4. The sliding mechanism as claimed in claim 1, wherein the V-shaped resilience device further comprises a plurality of rollers; each roller is disposed at a tail end of each one of the plurality of connectors; and each connector is substantially coupled with the guiding edge through one of the plurality of rollers.

5. A cellular phone with a sliding mechanism with changeable paths, the sliding mechanism comprising:
    a holding base;
    a sliding portion;
    wherein the sliding portion is configured to be driven by the sliding mechanism to slide back and forth with respect to the holding base, a sliding plate fixed to the sliding portion, the sliding plate comprising a plurality of fan-shaped spaces, wherein each one of the plurality of fan-shaped spaces is facing the other with respect to an axis;
    a V-shaped resilience device fixed on the sliding plate, the V-shaped resilience device having each end disposed in each one of the plurality fan-shaped spaces respectively, wherein the V-shaped resilience device comprises:
    a plurality of spring elements; a V-shaped support comprising a turning ring having at least one guiding protrusion extended downward; and a plurality of connectors each connecting with one end of the V-shaped support respectively, each one of the plurality of connectors having at least one supporting portion, each supporting portion corresponding to one spring element, and each spring element being disposed between one connector and the V-shaped support; and
    a fixed plate fixed to the holding base, the fixed plate comprising a plurality of guiding slots and a guiding edge, wherein the plurality of guiding slots and the guiding edge can be used to change a sliding path of the sliding plate; wherein one of the connectors is in contact with the guiding edge to press at least one of the plurality of spring elements to generate a resilient force, which causes the at least one guiding protrusion in the plurality of guiding slots to move along the at least one of the plurality of guiding slots.

6. The cellular phone as claimed in claim 5, wherein more than one guiding protrusions are substantially used to form two loops; the two loops share one of the guiding slots to allow the sliding plate to slide back and forth on the fixed plate along the two loops respectively.

7. The cellular phone as claimed in claim 6, wherein the guiding edge of the sliding mechanism substantially comprises an irregular loop.

8. The cellular phone as claimed in claim 5, wherein the V-shaped resilience device further comprises a plurality of rollers; each roller is disposed at a tail end of one of the plurality of connectors; and each connector is substantially coupled with the guiding edge through one of the plurality of rollers.

* * * * *